No. 806,629. PATENTED DEC. 5, 1905.
P. M. BOEHME.
BIT FOR ANIMALS.
APPLICATION FILED MAR. 15, 1905.

WITNESSES
Paul M. Boehme, INVENTOR.
BY Charles A. Stephens,
his ATTORNEY.

UNITED STATES PATENT OFFICE.

PAUL M. BOEHME, OF NEW YORK, N. Y.

BIT FOR ANIMALS.

No. 806,629.  Specification of Letters Patent.  Patented Dec. 5, 1905.

Application filed March 15, 1905. Serial No. 250,174.

*To all whom it may concern:*

Be it known that I, PAUL M. BOEHME, a citizen of the United States, and a resident of Greater New York, borough of Brooklyn, in the county of Kings and State of New York, have invented certain new and useful Improvements in Bits for Animals, of which the following is a specification.

My invention relates to bits for animals. It has for its object to provide a convertible bit which is adapted normally to serve as an ordinary bit when the animal is gentle and under control of the driver and when vicious adapted to be converted, by simply pulling sharply on the reins, into a bit which will quickly place the animal under control of the driver and when the animal has quieted down will assume its normal condition automatically by simply allowing the reins to become slack.

It has for a further object to provide a bit of the character set forth embodying advantages in point of simplicity and inexpensiveness of construction, perfect operation, strength, and durability.

Figure 1:
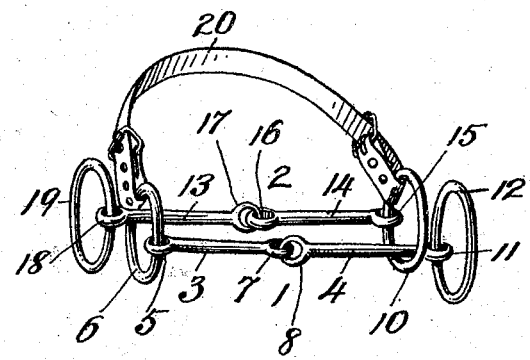
Figure 2:
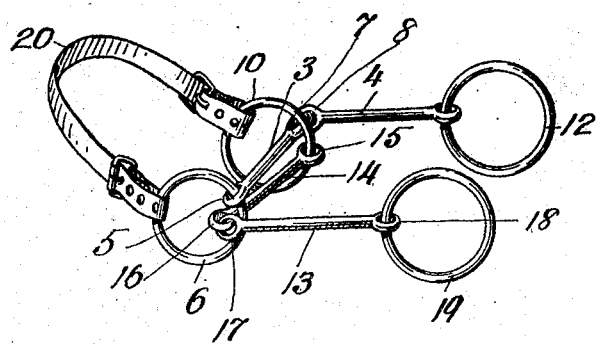

In the drawings, Figure 1 is a perspective view showing the bit in its normal condition, so as to serve as an ordinary bit when the animal is under control of the driver. Fig. 2 is a perspective view showing the bit in its converted condition, so as to place a vicious animal under control of the driver.

In both figures of the drawings illustrating my invention like reference characters designate corresponding parts.

Referring to the drawings, 1 and 2 designate bars adapted to be placed within the mouth of the animal, and in the normal condition of the bit when it is serving as an ordinary bit these bars assume a substantially parallel relation. The bar 1 comprises an inner member 3 and an outer locking member 4, the member 3 having a loop 5 on its outer end, engaged by a small ring 6, and on its inner end a loop 7, engaged by a loop 8 on the inner end of the member 4, the outer end of said member 4 passing through a small ring 10 and having a loop 11, engaged by a large ring 12. The bar 2 comprises an inner member 13 and an outer locking member 14, the member 14 having a loop 15 on its outer end, engaged by the small ring 10, and on its inner end a loop 16, engaged by a loop 17 on the inner end of the member 13, the outer end of said member 13 passing through the small ring 6 and having a loop 18, engaged by ring 19. One end of a nose-strap 20 is adjustably secured to the ring 10 and the other end adjustably connected to the ring 6, thus adapting the strap to be adjusted to hold the bit in the proper position. The reins are attached to the rings 12 and 19.

From the foregoing it will be understood that so long as the animal remains under control of the driver and the reins are not pulled too tightly the parts of the bit will remain in the condition shown by Fig. 1; but if the animal becomes vicious and the reins are pulled sharply the parts assume the condition shown by Fig. 2, in which condition the small rings will be drawn into the animal's mouth, so as to press against the tongue and gums, and the outer locking members will be turned rearwardly, locking said rings and inner members, thereby forcing the animal to open its mouth and preventing biting into the bit, as animals do when attempting to run away.

I do not wish to be understood as limiting myself to the precise details and arrangements of parts shown and described, but reserve the right to all modifications within the scope of my invention.

Having now described my invention, what I claim as new, and desire to secure by Letters Patent, is—

A bit comprising a supporting-strap having rings, two bars each having an inner member and an outer locking member hinged together, the inner member of each loosely connected to one of the rings of the supporting-strap and the outer locking members passing through said rings and designed to be turned rearwardly to lock the inner members and said rings on the strap in their inner positions, substantially as described.

Signed at borough of Brooklyn, New York city, in the county of Kings and State of New York, this 3d day of March, A. D. 1905.

PAUL M. BOEHME.

Witnesses:
HORACE W. SCANDLIN,
WM. G. PHILLIPS.